United States Patent Office

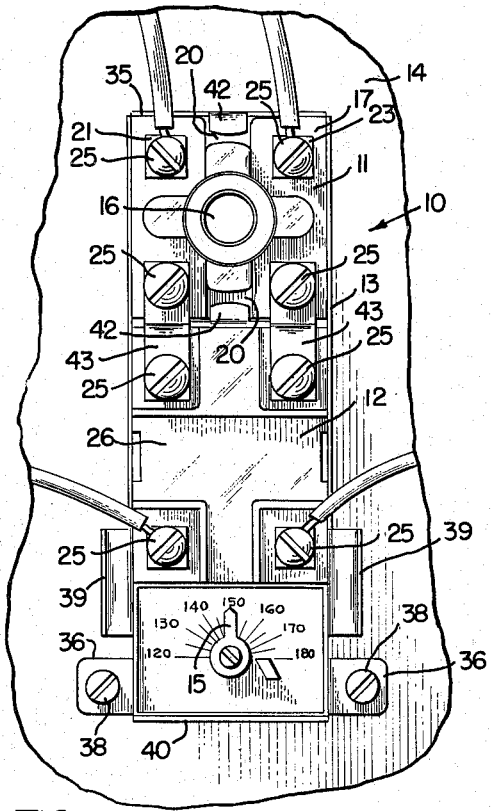

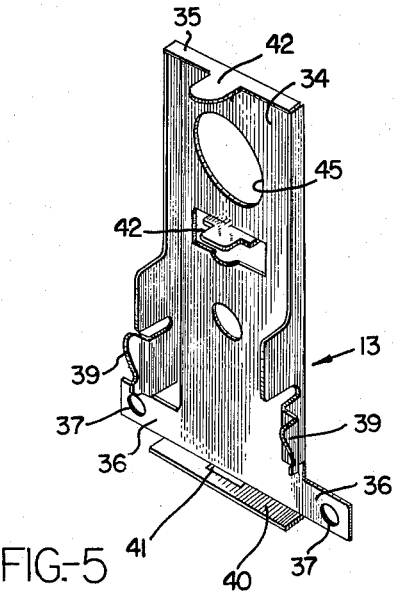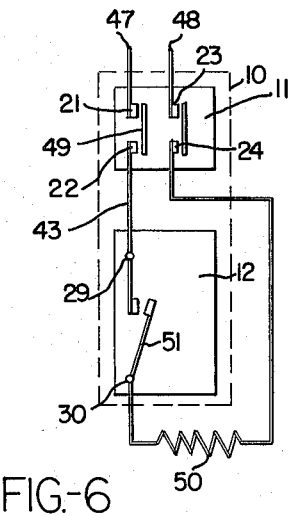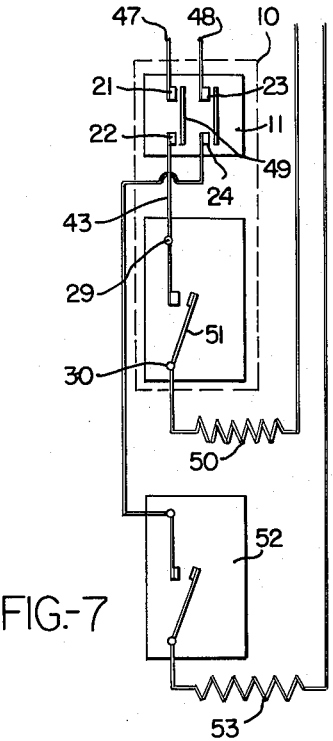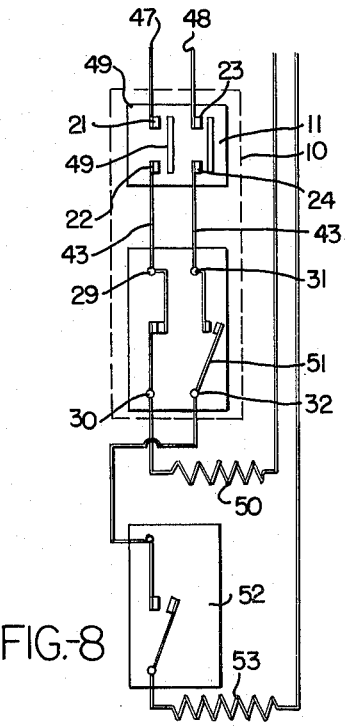

3,242,293
Patented Mar. 22, 1966

3,242,293
SELF-CONTAINED MAIN AND SAFETY SWITCH
STRUCTURES AND PARTS THEREFOR
Siegfried E. Manecke, Indiana, Pa., assignor to Robertshaw Controls Company, Richmond, Va., a corporation of Delaware
Filed Feb. 5, 1964, Ser. No. 342,618
10 Claims. (Cl. 200—136)

This invention relates to an improved self-contained electrical switch structure and to an improved mounting bracket for such a switch structure or the like.

It is well known that many thermostatic switch constructions are utilized in combination with a safety limit switch construction so that when the condition controlled by the main thermostatic switch construction exceeds a safe predetermined limit, the safety limit switch construction terminates the operation of the main switch construction until the safety switch construction is manually reset.

In particular, such switch constructions can be utilized in the water heater field wherein the main thermostatic switch construction thermostatically controls the operation of a heater element for the water heater tank depending upon the temperature of the water in the water heater tank. The safety limit switch construction also senses the temperature of the water in the water heater tank and, when the temperature of the water in the water heater tank exceeds a safe predetermined limit, the safety limit switch construction terminates the entire operation of the heater element until the safety limit switch construction is manually reset.

In such a combination of switch constructions as set forth above, it has been found that not only was a multitude of parts provided, but also the multitude of parts of the above described combination requires time consuming assembly operations not only at the water heater assembly plant but also in the field during replacement and repair operations.

However, according to the teachings of this invention, an improved self-contained structure is provided wherein the safety limit switch construction and the main thermostatic switch construction are held together by a unitary mounting bracket in a novel manner hereinafter set forth whereby the entire combination is a self-contained unit and can be readily attached to the water heater tank or the like in a simple and effective operation.

Accordingly, it is an object of this invention to provide an improved self-contained switch structure having one or more of the novel features set forth above or hereinafter shown or described.

Another object of this invention is to provide an improved mounting bracket for such a switch structure or the like.

Other objects, uses and advantages of this invention are apparent from a reading of this description which proceeds with reference to the accompanying drawings forming a part thereof and wherein:

FIGURE 1 is a fragmentary front view illustrating the improved self-contained switch structure of this invention mounted to the exterior surface of a water heater tank or the like.

FIGURE 2 is a side view of the combination illustrated in FIGURE 1.

FIGURE 3 is an exploded perspective view illustrating various parts of the switch structure illustrated in FIGURE 1.

FIGURE 4 is a reduced rear view of the switch constructions of the combination illustrated in FIGURE 3.

FIGURE 5 is a front perspective view of the improved mounting bracket of this invention.

FIGURES 6–8 are respectively schematic views illustrating various uses of the self-contained switch structure of this invention.

While the various features of this invention are hereinafter described and illustrated as being particularly adaptable for combining a safety limit thermostatic switch construction with a main thermostatic switch construction, it is to be understood that the various features of this invention can be utilized singly or in any combination thereof to provide a self-contained structure for other devices as desired.

Therefore, this invention is not to be limited to only the embodiment illustrated in the drawings, because the drawings are merely utilized to illustrate one of the wide variety of uses of this invention.

Referring now to FIGURES 1 and 2, the improved self-contained switch structure of this invention is generally indicated by the reference numeral 10 and comprises a safety limit thermostatic switch construction 11 and a main thermostatic switch construction 12 held together by a unitary mounting bracket 13 of this invention in a manner hereinafter described, the switch structure 10 being adapted to be mounted to the exterior wall of a water heater tank 14 by the mounting bracket 13 in a manner hereinafter described.

The main thermostatic switch construction 12 is adapted to be interconnected to an electrical heater element for the water heater tank 14 in a conventional manner and, through suitable actuating mechanism controlled by an indicator 15, the main switch construction 12 is adapted to maintain the water in the water heater tank 15 at the desired temperature by sensing the temperature of the water in the water heater tank 14 through the wall thereof in a manner hereinafter described.

However, the safety limit thermostatic switch construction 11 is also provided to sense the temperature of the water in the water heater tank 14 through the wall thereof so that when the temperature of the water in the water heater tank 14 exceeds the predetermined safe limit therefor, the safety limit switch construction 11 terminates the operation of the main switch construction 12 to discontinue the operation of the heater element for the water heater tank 14 until a reset button 16 of the safety switch construction 11 is manually depressed in a manner conventional in the art.

Therefore, it can be seen that by providing the safety switch construction 11 and the main thermostatic switch construction 12 together with the unitary mounting bracket 13, a self-contained switch structure 10 is provided which can be readily attached and detached to the water heater tank 14 in a simple operation without requiring the replacement of a multitude of parts in the manner provided by the prior art.

The particular details of the self-contained switch structure 10 of this invention will now be described and reference is made to FIGURES 3–5.

The safety limit switch construction 11 comprises a conventional housing 17 having an opened rear side 18 in the manner illustrated in FIGURE 4 whereby a thermostatic snap action disc construction 19 of the switch construction 11 is exposed at the rear side 18 of the switch construction 11 to sense the temperature of the exterior wall of the water heater tank 14 in a manner hereinafter described, the snap action member 19, when snapped over center, opens switch means in the switch construction 11 which will remain open until the snap action member 19 is snapped back over center by manually depressing the reset button 16 in a conventional manner.

The safety limit switch construction 11 has a pair of opposed recesses 20 provided therein for a purpose hereinafter described and has a plurality of terminal posts 21, 22, 23 and 24 to be respectively interconnected to an electrical lead means by threaded fastening members 25 in the manner illustrated in FIGURE 1.

The main thermostatic switch construction 12 also comprises a housing 26 having an opened rear side 27 in the manner illustrated in FIGURE 4 to expose a thermostatic element 28, such as a bimetal member or the like, which opens and closes a circuit in the switch construction 12 depending upon the temperature of the exterior surface of the water heater tank 14 in a manner conventional in the art.

The switch construction 12 also has four terminal posts 29, 30, 31 and 32 adapted to be respectively interconnected to lead means by the threaded fastening members 25 previously described.

The switch construction 12 has a flat tongue 33 projecting downwardly therefrom in the manner illustrated in FIGURE 4 for a purpose hereinafter described.

The unitary mounting bracket 13 as illustrated in FIGURES 3 and 5 comprises a substantially flat plate-like member 34 having peripheral flange means 35 extending substantially about the entire outer periphery of the plate-like portion 34 except at outwardly directed lugs or ears 36 thereof, the ears 36 of the mounting bracket 13 having suitable apertures 37 passing therethrough to provide one means for detachably securing the self-contained switch structure 10 to the water heater tank 14 by means of threaded fastening members 38 passing through the apertures 37 into the water heater tank 14.

Alternately, or additionally, the mounting bracket 13 can have ear or lug means 39 formed from the peripheral flange 35 thereof to permit the mounting bracket 13 to be mounted to the water heater tank 14 by a conventional mounting member extending between the heater unit structure and the self-contained switch structure 10 of this invention.

The lower portion 40 of the peripheral flange 35 of the mounting member 13 has a substantially rectangular slot 41 passing therethrough to receive the tongue 33 of the main thermostatic switch construction 12 when the switch construction 12 is received in the substantially cup-shaped mounting bracket 13 and has the rear side 27 thereof disposed against the front side of the plate-like portion 34 of the mounting bracket 13. In this manner, the cooperation of the tongue 33 of the switch construction 12 and the slot 41 of the mounting bracket 13 permits the switch construction 12 to be substantially pivotally mounted to the mounting bracket 13 to permit the switch construction 12 to be removed from the mounting bracket 13 even though the safety limit switch construction 11 remains mounted thereto as will be apparent hereinafter.

A pair of integral ear means 42 are formed on the mounting bracket 13 and normally extend outwardly in a perpendicular manner relative to the front side of the plate-like portion 34 thereof, the ear means 42 being spaced apart a distance equal to the width of the safety limit switch construction 11 so that the same can be inserted therebetween and have the rear side 18 thereof disposed against the front side of the plate-like portion 34 of the mounting member 13.

After the safety limit switch construction 11 has been assembled to the bracket 13 in the manner set forth above, the ear means 42 are bent inwardly over the safety limit construction 11 to be respectively received in the recesses 20 thereof to detachably mount the switch construction 11 to the mounting bracket 13 in an interlocking relation therewith.

Thereafter, or before, the main thermostatic switch construction 12 is held at an angle relative to the mounting bracket 13 and has the tongue 33 thereof inserted in the slot 41 of the mounting bracket 13 so that the switch construction 12 can be pivoted toward the mounting bracket 13 to be positioned intermediate the lower portion 40 of the peripheral flange 35 of the mounting bracket 13 and the adjacent ear means 42 thereof.

After both switch constructions 11 and 12 have been assembled to the mounting bracket 13 in the above manner, rigid lead means 43 are utilized to interconnect the desired terminals of the switch constructions 11 and 12 together.

For example, the rigid lead means 43 can comprise bent metal members to conform to the configuration of the switch constructions 11 and 12 and span the terminals 22, 29 and 24, 31 to be detachably secured thereto by the threaded fastening members 25 passing through suitable apertures 44 formed in the lead means 43, at least one of the apertures 44 in each lead means 43 being an elongated slot to allow for different spacings between the switch constructions 11 and 12.

In this manner, not only do the rigid lead means 43 electrically interconnect the safety limit switch construction 11 with the main thermostatic switch construction 12, but also since the safety switch construction 11 is fixedly secured to the mounting bracket 13 by the bent ear means 42 and since the lead means 43 are rigid, the lead means 43 hold the main thermostatic switch construction 12 in its pivoted position against the plate-like means 34 of the mounting bracket 13 to prevent pivotal movement of the switch construction 12 relative to the mounting bracket 13.

Thus, it can be seen that when the parts illustrated in FIGURE 3 are assembled together in the above manner, the mounting bracket 13 holds the switch constructions 11 and 12 in fixed position relative thereto and provides a self-contained switch structure 10 which can be shipped and stored in a self-contained manner without requiring the stocking of individual parts to be later assembled together either at the assembly plant or in the field.

The mounting bracket 13 has the plate-like portion 34 thereof provided with openings 45 and 46 which are respectively aligned with the thermostatic elements 19 and 28 of the respective switch constructions 11 and 12 so that the thermostatic elements 19 and 28 of the switch constructions 11 and 12 can readily sense the temperature of the exterior wall of the water heater tank 14 when the self-contained structure 10 is mounted to the water heater tank 14 in the manner previously set forth.

Thus, it can be seen that the mounting bracket 13 not only holds the switch constructions 11 and 12 together, but also provides a means for closing the rear sides of the switch constructions 11 and 12 while still permitting the thermostatic elements of the switch constructions to sense the temperature of the water heater tank 14.

While the self-contained switch structure 10 of this invention can be electrically interconnected in any desired manner, three such examples are given respectively in FIGURES 6–8.

In FIGURE 6, it can be seen that a source of current is interconnected by leads 47 and 48 to the terminals 21 and 23 of the safety limit thermostatic switch construction 11 which has the terminals 21, 22 and 23, 24 interconnected together by switch means 49 under the influence of the operation of the thermostatic disc construction 19 previously described. The terminal 22 of the switch construction 11 is interconnected to the terminal 29 of the switch construction 12 by the rigid lead means 43 previously described.

The electrical heater element 50 for the water heater tank 14 is interconnected across the terminals 30 and 24 of the switch constructions 12 and 11 in the manner illustrated in FIGURE 6 whereby a switch means 51 in the switch construction 12 is adapted to open and close the interconnection between the terminals 29 and 30 thereof upon the influence of the temperature on the thermostatic element 28 of the switch construction 12.

Thus, it can be seen that as long as the switch means 49 of the safety limit switch structure 11 is closed and the thermostatic element 28 senses a temperature below the temperature selected by the indicator 15 on the switch construction 12, current will flow to the heater element 50 to tend to heat up the water in the water heater tank 14. When the temperature of the water in the water heater tank 14 exceeds the selected temperature, the switch 51 of the switch construction 12 opens and terminates the flow of current through the heater element 50. However, should the temperature of the water in the water heater tank 14 exceed a predetermined safe limit as determined by the thermostatic element 19 of the safety limit switch construction 11, the switch means 49 thereof is permanently opened by the disc construction 19 to terminate all supply of current to the heater element 50 until the reset button 16 of the switch construction 11 is manually depressed in the manner previously set forth.

Therefore, it can be seen that the self-contained switch structure 10 illustrated in FIGURE 6 can provide a conventional operation of the heater element 50 for a water heater tank 14 or the like while utilizing all of the features of this invention.

If desired, the self-contained switch construction 10 of this invention can be utilized to control an upper heater element of the water heater tank 14 while being utilized in combination with another thermostatic switch construction 52 in FIGURES 7 and 8 to control the operation of a lower heater element 53 of the water heater tank construction.

Therefore, it can be seen that the self-contained switch structure 10 of this invention can be provided in any desired system as represented respectively by FIGURES 6–8 while still remaining as a self-contained unit.

Accordingly, it can be seen that not only does this invention provide an improved self-contained switch structure, but also this invention provides an improved mounting bracket for such a switch structure or the like.

While the form of the invention now preferred has been disclosed as required by statute, other forms may be used, all coming within the scope of the claimed subject matter which follows.

What is claimed is:

1. In combination, a main thermostatic switch construction having terminal means, a safety limit thermostatic switch construction having terminal means, rigid lead means electrically interconnecting said terminal means together and tending to prevent movement between said switch constructions, and a mounting bracket means for holding both of said interconnected switch constructions closely together to provide a compact and self-contained combination that can be readily attached and detached to and from a desired supporting structure.

2. A combination as set forth in claim 1 wherein said rigid lead means comprises a metal strip bent to conform with the contours of said switch constructions.

3. In combination, a main thermostatic switch construction having an opened rear side and having terminal means, a safety limit thermostatic switch construction having an opened rear side and having terminal means, rigid lead means electrically interconnecting said terminal means together and tending to prevent movement between said switch constructions, and a mounting bracket means disposed against said rear sides of said switch constructions and holding both of said interconnected switch constructions closely together to provide a compact and self-contained combination that can be readily attached and detached to and from a desired supporting structure, said main switch construction and said safety switch construction each having thermostatic element, and said bracket means having openings passing therethrough adjacent each of said thermostatic elements.

4. In combination, a main thermostatic switch construction having terminal means, a safety limit switch construction having terminal means, rigid lead means electrically interconnecting said terminal means together and tending to prevent movement between said switch constructions, and a mounting bracket means disposed against said switch constructions and holding said switch constructions closely together to provide a compact and self-contained combination that can be readily attached and detached to and from a desired supporting structure, said bracket means having ear means interlocked to said safety switch construction to hold said safety switch construction to said mounting bracket means.

5. In combination, a main thermostatic switch construction, a safety limit switch construction, a mounting bracket means disposed against said switch constructions and holding said switch constructions together, said bracket means having ear means interlocked to said safety switch construction to hold said safety switch construction to said mounting bracket means, said bracket means having means to pivotally connect said main switch construction to said mounting bracket, and rigid lead means interconnecting said switch constructions together and holding said main switch construction in one pivoted position relative to said mounting bracket means.

6. A combination as set forth in claim 5 wherein said main switch construction has a tongue and said mounting bracket means has a slot receiving said tongue to pivotally connect said main switch construction to said mounting bracket means.

7. In combination, a main thermostatic switch construction having an open rear side and having a thermostatic element exposed at said rear side thereof, a safety limit switch construction having an open rear side and having a thermostatic element exposed at said rear side thereof, a mounting bracket means receiving said switch constructions and holding said switch constructions to provide a self contained combination, said bracket means having openings passing therethrough and respectively aligned with said thermostatic elements, said bracket means having ear means interlocked to said safety switch construction to hold said safety switch construction to said bracket means, said bracket having means pivotally connecting said main switch construction to said bracket means, and rigid lead means interconnecting said switch constructions together and holding said main switch construction in one pivotal position against said bracket means.

8. A combination as set forth in claim 7 wherein said ear means of said bracket means are integral therewith.

9. A combination as set forth in claim 7 wherein said main switch construction has a tongue and wherein said bracket means has a slot receiving said tongue to pivotally connect said main switch construction to said bracket.

10. A combination as set forth in claim 7 wherein said bracket means has means to attach the same to a supporting structure.

References Cited by the Examiner

UNITED STATES PATENTS

| | | | |
|---|---|---|---|
| 2,691,712 | 10/1954 | Malone | 200—138 X |
| 2,903,540 | 9/1959 | Gloviak et al. | 200—168 X |
| 2,987,919 | 5/1961 | Kirby | 200—138 X |
| 3,022,405 | 2/1962 | Stevens | 200—67 X |
| 3,172,014 | 3/1965 | Johnson | 317—119 |

BERNARD A. GILHEANY, *Primary Examiner.*

H. M. FLECK, *Assistant Examiner.*